United States Patent Office 3,137,615
Patented June 16, 1964

---

3,137,615
METHOD FOR PROTECTING PLANTS EMPLOYING ALKANEDITHIOLS
Stanley T. Ichikawa and John E. Larson, Modesto, Calif., assignors to Shell Oil Company, New York, N.Y., a corporation of Delaware
No Drawing. Filed May 9, 1960, Ser. No. 27,515
7 Claims. (Cl. 167—22)

This invention relates to a method for protecting living plants by destroying organisms which attack them. More particularly, this invention relates to a method for protecting living plants by killing nematodes and microorganisms which attack the roots of the plants and thereby improving the growth of the plant.

Commercial nursery practice involves to an ever-increasing extent the transplanting of living plants. Despite the use of the best known practices of husbandry, plants become infested with nematodes and/or soil-borne phytopathogenic microorganisms such as fungi, bacteria, and slime molds. Transplantation of these plants, including the soil in which they are growing, inevitably results in the spread of the nematode and/or microorganism infestation. Some progress has been made in the development of soil fumigants which permit the destruction of the nematodes and the microorganisms in situ in the soil in which the plants are growing. Use of these fumigants requires great care, however, to avoid injury to the growing plants, and even these fumigants have not proven to be entirely effective in destroying the nematodes and/or microorganisms which are present on the roots of the plants. Further, such fumigants do not ordinarily destroy cysts formed by female cyst-forming nematodes and containing the eggs of the nematodes. The infestation of nematodes can to some extent be diminished by washing all soil from the roots of the plants to be transplanted, but this method does not remove all of the nematodes, since many of their cysts remain in root tangles, cracks or crevices in or between roots, and in galls, or other abnormalities in the roots caused by the attack of the nematodes. Further, simple washing of the roots of the plants does not destroy noxious microorganisms present thereon. Since most states have strict quarantine regulations prohibiting importation and/or traffic within the state of plants which are infested with nematodes, infestation by nematodes sharply reduces the value of the plants, and may even prevent use of the plants.

There is, therefore, a great need for a method for destroying the nematodes and phytopathogenic microorganisms which are present on the roots of living plants without injury to the plants. The standards which such a method would have to satisfy are very severe: the method must effectively destroy the nematodes and microorganisms, yet must not be phytotoxic to the plants being treated.

Just such a method now has been discovered. Briefly, the method comprises contacting the surfaces of the roots of plants which are infested by noxious organisms with a liquid composition containing at least one alkanedithiol or a carboxylic acid ether thereof.

This method has been found to be effective for destroying nematodes and microorganisms such as bacteria and fungi present on plant roots without causing damage to the plants themselves. Further, it has the advantages that: very small amounts of the dithiols or their esters are required per plant; ordinarily, aqueous solutions or suspensions are employed; the technique and physical equipment required are both very simple, so that the method can readily be performed by unskilled persons, thus reducing the cost per plant treated. Based on present costs of the active materials and labor, this method effects the protection of plants at very low cost per plant.

Described in somewhat more detail, nematodes and microorganisms present on the roots of a living plant are destroyed by wetting the roots of the plants with a liquid composition containing a pesticidally effective but nonphytotoxic concentration of at least one alkanedithiol or a carboxylic acid ester thereof, then planting the plants or shipping the plants for later planting. Ordinarily, the contact of the surface of the roots of the plant with the pesticide composition will be most conveniently and effectively attained by immersing the roots, preferably freed from at least most of the soil in which they are growing, in a mass of the pesticide composition so that the surfaces of the roots are thoroughly wetted by the pesticide composition. The roots then can be withdrawn from the mass of the pesticide composition and the plant planted. If desired, the plant's roots may be rinsed with water after the plant is removed from contact with the liquid composition, or the plant may be planted without any intervening rinse.

It has been found that when plants which have been treated according to the method of this invention are planted in clean soil free from noxious organisms, a substantial improvement in growth occurs—as compared to plants infested with nematodes and/or noxious microorganisms planted in the same kind of clean soil.

According to this invention, the compounds which have been found to have the unique combination of (a) the high activity against nematodes, and which effectively control microorganisms such as fungi, bacteria, and slime molds, and (b) the low toxicity toward living plants which permits their use to protect living plants without harm to the plants are the alkanedithiol, and the mono- and diesters of such dithiols with carboxylic acids. The pesticidal materials employed in the method of this invention can be described by the generic formula:

$$R—S—R'—S—R''$$

wherein R and R'' each represent a hydrogen atom or an acyl group of a carboxylic acid, and R' represents an alkylene group. Included in this class of compounds are the dithiols themselves, and their mono- as well as their diesters with carboxylic acids.

Suitable compounds of this class therefore are those wherein both R and R'' are hydrogen. Also suitable are those wherein either or both of R and R'' is an acyl group of a carboxylic acid.

The group R' suitably is an alkylene group, of straight-chain configuration that is, suitable dithiols are the straight-chain alpha, omega-alkanedithiols, and suitable esters are the mono- and diesters of such dithiols with carboxylic acids.

These compounds wherein the group R' contains not more than about 20 carbon atoms are most readily available, are entirely suitable for use in the method of the invention, and accordingly are to be preferred. Of these, the compounds wherein R' represents an alkylene group of from 1 to about 10 carbon atoms are most readily available at relatively low cost are effective pesticides and are therefore most preferred.

Included are the monoesters (either but not both of R and R'' is acyl) and the diesters (both R and R'' are acyl) of these dithiols.

By "acyl" is meant the radical derived from a carboxylic acid by removal of the hydroxyl group, the acid and the resulting acyl group containing, for example, up to 20 carbon atoms, or even more. Where the carboxylic acid has the formula R—C(O)—OH, the acyl radical has the formula $R^x$—C(O)—. Suitably the acyl radical may be that of a lower aliphatic mono- or polycarboxylic acid. Also suitably the acyl radical may be that of an aryl mono- or polycarboxylic acid, including those wherein the aryl group is substituted by one or more non-hydrocarbon substituents. The aliphatic radical represented by R^x thus can be aliphatic hydrocarbon, or it can be substituted hydrocarbon. R^x thus can represent an aliphatic hydrocarbon radical, such as an alkyl radical, an alkenyl radical, an alkynyl radical, an alkadienyl radical, or the like, and that radical can be of either straight-chain or branched-chain configuration. Likewise, R^x can represent one of such aliphatic hydrocarbon radicals which is substituted by a substituent such as a halogen atom, a cyano radical, a nitro radical, a hydroxyl radical or a mercapto radical. R^x can also represent an aralkyl radical. Because of their desirable properties the esters wherein the acyl group is that of an alkane monocarboxylic acid (i.e., the acyl group of an alkanoic acid) of from one to ten carbon atoms are of particular interest as pesticides in the method of the invention.

One or both of R and R″ can represent an acyl group of a carboxylic acid. Of the esters, the esters (particularly diesters) of alkane dithiols with lower molecular weight alkane carboxylic acids, for example, the alkanoic acids of from one to ten carbon atoms, are preferred because of their ready availability and high pesticidal activity.

Typical species of this class include 1,2-ethanedithiol, its monoacetate and its diacetate, 1,5-pentanedithiol, its dipropionate ester, 1,6-hexanedithiol, 1,6-hexanedithiol diacetate and 1,6-hexanedithiol dibenzoate and the like.

These dithiols and their esters, and methods for their preparation are well known, an excellent summary being set forth in the first two chapters of volume 1 of Reid, "Organic Chemistry of Bivalent Sulfur," Chemical Publishing Co., 1958.

The value of the method of this invention for destroying nematodes was demonstrated by the following tests.

Tomato plants were grown under uniform conditions in soil infested with nematodes, primarily Meloidogyne incognita (var. acrita). The infested plants then were removed from the soil, washed thoroughly and for 24 hours each was soaked in aqueous liquid composition containing the test chemical, then was removed, the roots rinsed with water and the plant planted in clean soil. About a month later, the plants were harvested and examined for any new infection and to determine if any damage had been done to the plant by the treatment. The observations were made, and the extent of control of the nematodes estimated by experienced observers.

The following results were obtained.

| Compound | Concentration of compound in liquid composition which resulted in indicated control on nematodes (parts per million by weight of the liquid composition used) | | Damage to plants at concentration of compound used |
| --- | --- | --- | --- |
| | Concentration | Percent Control | |
| 1,2-ethanedithiol | 250 | 83 | None. |
| 1,4-butanedithiol | 250 | 100 | None. |
| 1,5-pentanedithiol | 250 | 96 | None. |
| 1,6-hexanedithiol | 100 | 93 | None. |
| 1,6-hexanedithiol diacetate | 100 | 100 | None. |

Other compounds which were observed to kill nematodes without observable damage to the plants were 1,9-nonanedithiol and 1,10-decanedithiol.

Aqueous liquid compositions containing 1,6-hexanedithiol diacetate were employed in the treatment of a wide variety of common plants, those used being set out below. In all cases, it was found that no injury to the plants occurred at concentrations at or in excess of those which effectively destroy nematodes. Two series of tests were run: Series A, wherein the roots of the plant were rinsed with water after removal of the roots from the treating liquid; Series B, wherein the roots of the plant were not rinsed after removal of the roots from the treating liquid. The time of treatment of the roots in the treating solution: 24 hours in both series. The plants treated were: Thuja (Golden Arborvitum), Strawberry, Philodendron, assorted berries (Rubus), and Gardenia.

The effectiveness of the method of this invention for destroying microorganisms, including both fungi and bacteria, was demonstrated by the following tests:

An aqueous liquid composition containing the test chemical was added to a culture tube containing Emerson's broth, to provide the desired concentration of chemical in the broth. The broth then was inoculated with the desired microorganism and the tube was sealed. After incubation for a set period under controlled temperature, growth or inhibition of the organism was determined by visual examination. The microorganisms used, the chemicals used, and the concentration in parts per million by weight in the broth required for control of the microorganisms were as follows:

| Microorganism | Chemical | Concentration of chemical required for kill of the microorganism |
| --- | --- | --- |
| Mycobacterium avium (acid-fast bacterium) | 1,6-hexanedithiol | less than 10 |
| Verticillium albo-atrum (fungus) | ___do___ | 10–100 |
| Penicillium italicum (fungus) | ___do___ | 10–100 |
| Chaetomuim globosum (fungus) | ___do___ | 10–100 |
| Sclerotium rolfsii | ___do___ | 10–100 |
| Mycobacterium avium (acid-fast bacterium) | 1,6-hexanedithiol diacetate | less than 10. |
| Escherichia coli (gram-negative bacterium) | ___do___ | 10–100. |
| Leuconostoc mesenteroides (fungus) | ___do___ | 10–100. |
| Penicillium italicum (fungus) | ___do___ | 10–100. |
| Chaetomuim globosum (fungus) | ___do___ | 10–100. |
| Sclerotium rolfsii | ___do___ | 10–100. |

It is accordingly evident that these dithiols and their esters are effective fungicides and bactericides, being lethal to a wide spectrum of these microorganisms. It will be further noted that these dithiols and their esters are effective fungicides and bactericides at concentrations at which they are also effective nematocides.

These pesticidal agents ordinarily are used in the form of an aqueous solution and/or suspension of appropriate strength, since the solution will be directly applied to the roots of the plant and since water is a solvent which will not injure the roots. Other solvents may be present or may be used, as desirable and convenient, but in all cases, care must be taken to insure that the solvent is one which is not phytotoxic.

In general, suitable solvents other than water are the essentially neutral oxygen-containing organic liquids, such as the alcohols, ketones and esters. In many cases, it will be found that the dithiol or its ester will be more soluble in a mixture of a lower alcohol or ketone and water than in water alone, so that the use of such mixtures will be advantageous. As a general matter, liquid hydrocarbons are not suitable because the solutions and/or suspensions made up from them tend to be unduly phytotoxic.

Likewise, other materials may be present in the liquid composition, provided that they do not injure the plant roots. Thus, surface-active agents—emulsifiers, detergents or the like—may be added, or hormones, fertilizers, or other special purpose chemicals may be included to provide multi-purpose compositions.

The concentration of a particular one or ones of the pesticides to be used in the liquid composition employed to treat any given species of plant will depend upon several factors: the pesticide or pesticides used, the species of plant used—particularly from the standpoint of the character of its roots, which is to say, whether its roots are smooth or rough, fleshy or fibrous, tender or woody, the extent to which they have been modified by attack by the nematodes and microorganisms and the nature of those modifications—and the character of the organisms to be destroyed. The pesticides used in the process of this invention are effective fungicides and bactericides in many cases at concentrations of as little as 5 parts per million by weight of the composition and are effective nematocides at concentrations of as little as about 3 parts per million by weight of the composition. In the usual case, it will be found that a concentration in excess of about 800 parts per million by weight of the composition will not be required and therefore concentrations above this level preferably are not used. It will be appreciated that as in the case of any chemical which exhibits biocidal activity, injury to the roots of the plants can occur if a concentrated solution or suspension of a pesticide of the method of this invention is applied to those roots. The concentrations set out herein are those which the experimental evidence available show are effective pesticidal dosages which are not phytotoxic. Usually, a concentration of the pesticide of from about 10 to about 600 parts per million by weight of the composition will be found best, since at these concentrations both nematodes and microorganisms are effectively destroyed and possibility of injury to the plant by the pesticide is minimized.

The plants are ordinarily most conveniently and effectively treated by simply contacting their roots with the liquid pesticide composition, and allowing them to remain in contact with the composition for the time required to effect destruction of the undesired organisms on the roots. The contact can be effected by drenching the soil surrounding the roots with the pesticide composition to wet the roots thoroughly with that composition. However, usually it will be found most convenient and effective to remove at least the major part of the soil surrounding the roots before those roots are contacted with the pesticide composition. Thus, in one aspect of the method of this invention, the infested plant is carefully removed from the soil, its roots immersed in the pesticide composition for the necessary time, then it is removed from contact with the composition and replanted, or prepared for shipment. In many cases it will be found preferable to rinse most of the soil from the roots of the plant before it is treated—i.e., the "bare root" plant is treated. Where the plant is to be packed for sale in "bare-root" condition, this aspect of the method of the invention is particularly convenient. In some cases, a contact period of as little as a few minutes—for example, 15 to 60 minutes—will be sufficient, while in other cases, primarily where access to the organisms by the pesticide is difficult to obtain, as much as 36 to 48 hours contact time may be required. Ordinarily a contact time of from about 8 to about 24 hours will be sufficient. In some cases, it may be found convenient and/or desirable to immerse the entire plant in the pesticidal composition. This particular technique may be used to destroy noxious microorganisms present on the stems and leaves of the plant as well as on its roots.

Where the roots of the infested plants are immersed in a mass of the pesticide composition, the composition from which the plants have been removed may be reused, provided that the concentration of pesticide therein is sufficiently high, or provided that additional pesticide is added to attain the necessary concentration.

After removal from the pesticide composition, the plants may be planted, or packaged for shipment, without further treatment, or the roots of the plants may first be rinsed with water or other appropriate solvent to remove any excess of the pesticide composition remaining on the roots.

The method of the invention is effective in destroying the various parasitic nematodes which attack plant roots. By nematodes is meant those unsegmented roundworms of the class Nematoda, also known as eelworms, which customarily inhabit the soil and feed upon the roots of plants. Included are the cyst-forming nematodes of the genus Heterodera, the root knot nematodes of the genus Meloidogyne, the root-lesion nematodes of the genus Pratylenchus and the citrus nematodes of the genus Tylenchulus, the sting nematodes of the genus Belonolaimus, and the plant-parasitic nematodes of such genera as Ditylenchus, Nacobbus, and the like.

The method of the invention also is effective in destroying the various phytopathogenic soil-borne microorganisms, such as the fungal rots caused by the phytopathogenic fungi of the genera, Phytophthora, Verticillium, Armillaria, Alternaria, Fusarium, Pythium, Rhizoctonia, Sclerotium, Cytospora, Ceratostomella, Rosellinia (as in the Dematophora state of *Rosellinia necatrix*), Helminthosporium and the like, slime molds of the phylum Myxophyta (class Myxomycetes) and the family Plasmodiophoraceae (genus Plasmodiophora), and bacteria of the genus Actinomyces, and the like.

We claim as our invention:

1. A method for protecting plants by destroying nematodes and soil-borne microorganisms attacking their roots, said method comprising contacting the roots of said plants with a liquid composition containing, in a concentration toxic to said nematodes and microorganisms present on such roots but substantially nontoxic with respect to said roots, an unsubstituted alpha, omega-alkanedithiol of up to 20 carbon atoms.

2. A method according to claim 1 wherein the dithiol contains up to 10 carbon atoms.

3. A method for protecting plants by destroying nematodes and soil-borne microorganisms attacking their roots, said method comprising contacting the roots of said plants with a liquid composition containing, in a concentration toxic to said nematodes and microorganisms present on such roots but substantially nontoxic with respect to said roots, an ester of an unsubstituted alpha, omega-alkanedithiol of up ot 10 carbon atoms and an unsubstituted alkanoic acid of up to 20 carbon atoms.

4. A method according to claim 3 wherein the alkanoic acid contains up to 10 carbon atoms.

5. A method according to claim 3 wherein the said ester is the diester of the alkanedithiol.

6. A method for protecting plants by destroying nematodes and soil-borne microorganisms attacking their roots, said method comprising contacting the roots of said plants with a liquid composition containing, in a concentration toxic to said nematodes and microorganisms present on such roots but substantially nontoxic with respect to said roots, 1,6-hexanedithiol.

7. A method for protecting plants by destroying nematodes and soil-borne microorganisms attacking their roots, said method comprising contacting the roots of said plants with a liquid composition containing, in a concentration toxic to said nematodes and microorganisms present on such roots but substantially nontoxic with respect to said roots, 1,6-hexanedithiol diacetate.

References Cited in the file of this patent

UNITED STATES PATENTS

| | | |
|---|---|---|
| 2,770,638 | Giolite | Nov. 13, 1956 |
| 2,795,525 | Stansbury | June 11, 1957 |
| 2,852,426 | Stansbury | Sept. 16, 1957 |
| 2,864,738 | Scott | Dec. 16, 1958 |
| 2,864,739 | Scott | Dec. 16, 1958 |
| 2,882,197 | Webb | Apr. 14, 1959 |
| 2,998,346 | Scott | Aug. 29, 1961 |

OTHER REFERENCES

King: U.S. Dept. Agr. Handbook No. 69, May 1954, pages 90, 188, 189, 252.